(12) United States Patent
Bihannic et al.

(10) Patent No.: US 11,231,969 B2
(45) Date of Patent: Jan. 25, 2022

(54) METHOD FOR AUDITING A VIRTUALISED RESOURCE DEPLOYED IN A CLOUD COMPUTING NETWORK

(71) Applicant: Orange, Issy-les-Moulineaux (FR)

(72) Inventors: Nicolas Bihannic, Chatillon (FR); Gael Fromentoux, Chatillon (FR); Emile Stephan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 162 days.

(21) Appl. No.: 16/338,296

(22) PCT Filed: Sep. 29, 2017

(86) PCT No.: PCT/FR2017/052682
§ 371 (c)(1),
(2) Date: Jan. 14, 2020

(87) PCT Pub. No.: WO2018/065705
PCT Pub. Date: Apr. 12, 2018

(65) Prior Publication Data
US 2020/0233722 A1    Jul. 23, 2020

(30) Foreign Application Priority Data

Oct. 3, 2016  (FR) ..................................... 1659523

(51) Int. Cl.
*G06F 15/173* (2006.01)
*G06F 9/50* (2006.01)
*H04L 29/08* (2006.01)

(52) U.S. Cl.
CPC ............ *G06F 9/5077* (2013.01); *H04L 67/10* (2013.01); *G06F 2209/503* (2013.01)

(58) Field of Classification Search
CPC ... G06F 2209/503; G06F 9/5077; H04L 67/10
See application file for complete search history.

(56) References Cited

U.S. PATENT DOCUMENTS 9,619,262 B2 * 4/2017 Sabin ...................... G06F 21/53
10,503,914 B2 * 12/2019 Sabin ...................... G06F 21/53
(Continued)

FOREIGN PATENT DOCUMENTS

WO    2014182900 A1    11/2014
WO    2016060597 A1    4/2016

OTHER PUBLICATIONS

International Search Report dated Nov. 3, 2017 for International Application No. PCT/FR2017/052682 dated Sep. 29, 2017.
(Continued)

*Primary Examiner* — Yves Dalencourt
(74) *Attorney, Agent, or Firm* — David D. Brush; Westman, Champlin & Koehler, P.A.

(57) ABSTRACT

A method of auditing at least one virtualized resource deployed in a cloud computing network, implemented by an administration device in respect of the at least one resource, able to administer virtual network functions, the virtual infrastructure or the network services. The method includes: storing a set of rules of the audit which are associated with the at least one virtualized resource; receiving from the at least one virtualized resource a message including an item of information about an event arising on the virtualized resource; correlating the item of information received with the set of stored rules; and if the correlation is positive, sending, to a recording device, a command message for writing at least one datum linked to the item of information received in a data register associated with the at least one virtualized resource.

12 Claims, 5 Drawing Sheets

(56) References Cited

U.S. PATENT DOCUMENTS

| 10,880,189 | B2* | 12/2020 | Martinez | H04L 63/02 |
|---|---|---|---|---|
| 2009/0288084 | A1* | 11/2009 | Astete | G06Q 30/0601 |
| | | | | 718/1 |
| 2011/0231899 | A1* | 9/2011 | Pulier | H04L 63/0272 |
| | | | | 726/1 |
| 2012/0311344 | A1* | 12/2012 | Sabin | G06F 21/602 |
| | | | | 713/189 |
| 2014/0280961 | A1* | 9/2014 | Martinez | H04L 41/5054 |
| | | | | 709/226 |

OTHER PUBLICATIONS

Written Opinion of the International Searching Authority dated Nov. 3, 2017 for International Application No. PCT/FR2017/052682 dated Sep. 29, 2017.

English translation of the International Written Opinion of the International Searching Authority dated Nov. 3, 2017 for International Application No. PCT/FR2017/052682 dated Sep. 29, 2017.

"Network Functions Virtualisation (NFV); Management and Orchestration", Group Specification, ETSI GS NFV-MAN 001 V1.1.1 (Dec. 2014).

* cited by examiner

METHOD FOR AUDITING A VIRTUALISED RESOURCE DEPLOYED IN A CLOUD COMPUTING NETWORK

1. FIELD OF THE INVENTION

The invention lies in the field of virtualized architectures of telecommunications networks and in the field of cloud computing. The virtualization of architectures, composed of network functions, consists in implementing network software functions operating on generic computer hardware (non-specific operating systems).

2. PRIOR ART

Telecommunications networks are the subject of major enhancements which considerably impact either their deployment or their management.
Architecture virtualization probably constitutes one of the most decisive technological breakthroughs. Virtualization of the addressing, naming and routing functions in particular, and the bringing together of networks and the computing world, very strongly impact the job of operators, the administration of networks and the interactions between operators and partners, namely equipment suppliers, service providers and also customers. The architectures and the running of these networks by operators must also take into account this enhancement of networks, in particular so as to best exploit the advantages presented by network virtualization. In particular, virtualization allows greater flexibility making it possible to respond in a more reactive manner to new offerings and to evolving traffic trends. Virtualization of functions rests upon the deployment of preferably everyday equipment, that is to say equipment based on non-specific operating systems, thus making it possible to lower costs. Such equipment is generally deployed within data centers which may be quite centralized, hence far removed from the customers' access networks, or distributed, hence nearer the customers. This choice between centralized deployment and distributed deployment is made as a function in particular of the needs in terms of latency and accessibility of these functions. Standardization studies into the convergence of the techniques used in telecommunications networks on the one hand and the techniques of the computing world are discussed within the NFV (Network Function Virtualization) group of the ETSI (European Telecommunications Standards Institute).

The implementation of a network service rests upon the deployment of several virtual functions (VNF (Virtualized Network functions)). A network service is for example a virtual CPE (Customer Premises Equipment) service or else a virtual private network service while a virtual function VNF is for example an NAT (Network Address Translation) function, an HSS (Home Subscriber Service) function, a DPI (Deep Packet Inspection) function or any other function used for network service deployment. A network service rests upon the deployment of several virtual functions which are interconnected.

An NFV architecture is implemented in the following manner. A management system sends a network service implementation request to an orchestrator function. On the basis of this request, the orchestrator transmits an instantiation request to a manager of the infrastructure. This manager implements the VNFs while complying with a descriptor which specifies the conditions to be complied with for the deployment and the management of these VNFs. According to the ETSI/NFV terminology, the management system is an OSS/BSS (Operations Support System/Business Support System), the orchestrator is a VIM (Virtualized Infrastructure Manager). The flexibility relating to the localization of the VNFs for the implementation of a network service is fairly wide and they may for example be localized in data centers which are quite localized or are distributed within the infrastructure. The virtualized infrastructure within which the VNFs are deployed is a pooled infrastructure accommodating various types of VNFs, so as to offer a variety of network services for varied customers. This pooling ensures better flexibility, by virtue of the possibility of adding VNFs if needed, and this ensures better control of costs knowing that a single infrastructure allows several services to be satisfied.

This flexibility and this pooling nonetheless introduce new constraints for the operator, in particular with respect to partners, customers and suppliers/providers. The characteristics inherent in the network services, in particular in terms of security and quality of service, are constraining and it is indispensable at least to maintain them and if possible to improve them when function virtualization is chosen and implemented to the detriment of an architecture based on the deployment of specific physical equipment. Relations between operators and their partners are also impacted by the development of virtualized architectures. In particular, compliance with the operator's contractual commitments or SLAs (Service Level Agreements) with the partners, suppliers/providers is crucial. In particular, it must be possible for the VNF provider to be sure that the VNF has been deployed according to the parameters of the descriptor. A service provider must be able to have the assurance that the services that it offers its customers or that it implements for its own needs are instantiated according to the contract signed with the operator, the latter committing to a certain quality of service. It must also be possible for the regulator, in countries where such a regulator wishes in particular to ensure rules of competition or compliance with certain security conditions, to be sure of the proper implementation of the services in accordance with a previously issued specification. This allows it to be sure in particular that the service complies with its requirements.

With the VNFs being implemented by the operator, there is no possibility for external entities to check that the latter are deployed in accordance with what is indicated in the descriptor or to verify that the network services deployed on the basis of a chaining of VNFs complies with what is contractualized between the operator and the service provider. The external entity, such as the regulator, can no longer be sure of compliance with certain rules or of the proper implementation of a service or indeed of a specific function.

The object of the present invention is to remedy these drawbacks.

3. DISCLOSURE OF THE INVENTION

According to a first aspect, the method of auditing at least one virtualized resource deployed in a cloud computing network, implemented by an administration device in respect of the at least one said resource, able to administer virtual network functions VNF, the virtual infrastructure NFVI or the network services OSS/BSS, the method comprising:
  a step of storing a set of rules of the audit which are associated with the at least one virtualized resource, a step of receiving from the at least one virtualized resource a message comprising an item of information about an event arising on said virtualized resource, a step of correlating the received item of information with the set of stored rules, if the correlation is positive, a step of sending, to a recording device, a command message for writing at least one datum linked to the item of information received in a data register associated with the at least one virtualized resource.

The verification that a virtualized resource, such as a virtualized network function (VNF, Virtual Network Function), an infrastructure component managed by a virtualized infrastructure administration device (VIM Virtualized Infrastructure Manager) or a virtualized network service (NS Network Service) based on the implementation of several VNFs is operating as provided for in the specifications and in the engineering rules is one of the challenges that network operators, providers of VNFs and NS providers must successfully meet.

An administration device, deployed by the operator for example in an infrastructure based on a cloud computing network, makes it possible to manage one or more virtualized resources for which one wishes to be assured that they are operating in compliance with previously fixed conditions, so-called nominal conditions, the latter being present in an engineering document or a specifications document.

The administration device can be common to the audited virtualized resources or, depending on the case, several administration devices are implemented in particular if the virtualized resources are of various types. When dealing with auditing a virtualized service, it may be necessary to collect information relating to the infrastructure, to the VNFs and also to the service itself.

The nominal conditions may depending on the case be fixed by a provider of VNFs, an NS provider, the operator ensuring the management of the virtualized infrastructure or indeed an exterior entity, such as a regulating authority. For these selected virtualized resources, parameters are selected to be particularly tracked or audited. With the aim of gathering all the events that could occur on the parameters of the infrastructure, VNFs or NS selected, the administration device is able to be updated with a set of rules. The rules may for example relate:

to performance, by the configuration of thresholds on the basis of which a command for writing an alarm message can be emitted, to the engineering of the virtualized resources, where the movement of a resource may require the sending of a write command, to security, where the version of a hypervisor may require the sending of a write command.

The objective of these rules is to ensure tracking of the parameters which must be audited during the execution of the computer program. In the case where the tracking pertains to an NS relying on several VNFs or indeed the interconnection between these VNFs, the tracking of the data of the NS may require the tracking of data occurring on the various VNFs and the interconnections.

When an event, such as a modification of an interface availability or a clogging of a link or any other type of event, arises on a virtualized resource, the administration device is notified thereof and performs a correlation between the event arising on the virtualized resource and the parameters of the resource which are audited, for example by virtue of an audit-related computer program. In the case where the event corresponds to one of the audited parameters, the administration device commands the writing of an item of information linked to the event in a register. The administration device ensuring the writing in a register is usually ensured by a specific entity such as a mining entity (Miner). The selection of the mining entity in charge of writing the event can be carried out by configuration, typically by using a random process or else by using a circular permutation process (also called Round-Robin). The register used for writing the information can be specific to the virtualized resource or else linked to the virtualized architecture or indeed to the operator. Thus the various events impacting a virtualized resource will be present in the register, by virtue of the write command sent by the administration device to the mining entities and will be able to be accessible by any entity having reading rights to these registers, such as for example an entity providing the audited service to customers or an entity ensuring the provision of the VNF. This register thus ensures the traceability of the events arising on a virtualized resource and makes it possible to be able to trace events impacting a network resource. The register may for example be used to note a malfunctioning of a network function (routing, naming, security . . . ) or else the enhancement of a services offering over time. It is also a method that is useful in the administration of a network for the operator of this network.

According to a particular characteristic, the method of auditing furthermore comprises a step of reserving resources, comprising storage and processing capabilities, in the administration device as a function of the auditing rules to be stored.

The method of auditing requires additional resources in the administration device on the one hand to store the set of rules but also to manage the information received from the virtualized resource as well as the correlation to be performed. The administration device, in particular if it is in charge of several virtualized resources, is liable to be at the limit of capabilities for being able to successfully accomplish the auditing method. A lack of resources is liable to render the method of auditing inoperative since the administration device would be incapable of processing the information related to the events, write commands. The reservation of resources in the administration device makes it possible to be sure that this device will have the resources necessary for the audit and that these resources are not allocated to another process of the administration device. The method for reserving resources can consist for example in reserving memory space in the administration device or a virtual resource, comprising storage and processing capabilities, if the administration device is itself virtualized.

According to a particular characteristic, the step of storing a set of rules which are associated with the at least one virtualized resource of the auditing method is preceded by a step of obtaining said set from a single network management device.

The various administration devices involved in the audit of the virtualized resource must be configured with a set of audit-related rules. In particular in the case where several administration devices are involved in the audit, it is necessary to ensure coherence of the rules configured so that the data present in the register are actually sufficiently complete and coherent. The implementation of this coherence and of this completeness may advantageously be ensured by configuration of the rules in a single network management device which thereafter transmits the rules relating to each administration device involved in the audit. Thus, the entity in charge of the cloud computing network configures the set of rules in the management device which thereafter transmits the rules to the administration devices. The management entity may be an OSS/BSS (Operations Support System/Business Support System) management system or else a device of NFVO (Network Function Virtualization Orchestration) type defined in the document ETSI GS NFV-MAN 001 V1.1.1 (2014 December).

According to a particular characteristic, the write command message comprises an item of information linked to the reading rights in respect of said datum.

The data to be recorded in the data register may be of various types. Certain data may be considered to be confidential and the operator of the cloud computing network in which the virtualized resource is deployed wishes that the audit datum not be read by another entity. In this case, the command for writing the datum may advantageously comprise a parameter making it possible to indicate that the datum concerned in the command may or may not be accessible by another entity or to indicate which entities are authorized to access same. The item of information linked to the reading rights may in particular be used when the audit is performed subsequent to a contract entered into between the operator of the cloud computing network and another entity. The contract may stipulate that certain parameters are audited and that the register linked to the audit, made available to the entity with which the contract is signed, will contain the data related to these parameters in accordance with the contract. The network operator may however decide to audit certain parameters for its own needs and in that case does not grant the reading rights for these parameters, thus preventing the other entity from accessing them.

According to a particular characteristic, the set of rules associated with the at least one virtualized resource comprises parameters relating to the availability and to the performance of the virtualized resource.

Among the data to be recorded in a register, the information related to the availability and to the performance of the virtualized resource is particularly significant. In a cloud computing network architecture, the virtualized resources can be activated on demand and be deployed in remote data centers. An item of information in respect of non-availability of a virtualized resource transmitted by the administration device takes on an essential character since it is then necessary to provide for its replacement. In the case where the register collecting the audit data is used by a device for managing the cloud computing network, this item of information in respect of non-availability or of performance problem must be taken into account to implement a solution making it possible to alleviate the problem encountered. This may entail for example deploying a new virtualized resource or allocating memory space to existing virtualized resources. This information relating to performance also allows for example VNF providers to improve the design of their solutions.

According to a particular characteristic, the command for writing in a data register associated with the at least one virtualized resource is sent later on.

The administration device, when it stores a significant number of rules and when a sizable number of data have to be recorded in the register, this is liable to generate a significant number of write command messages destined for the register. These commands may be involved when the network is heavily loaded. The sending of these messages is of such a nature as to impact the availability of the network and the quality of the services relying on the network in question. Audit data do not necessarily need to be recorded in real time in the register. It may therefore be beneficial to send write command messages later on, so as not to overload the network with these messages and leave it available for example for value added services. This property of writing later on may be one of the rules received in the storing step.

According to a particular characteristic, the sending step is preceded by a step of selecting the recording device to which the item of information is sent.

The recording devices play a significant role in the updating of the registers. The writing of the data in the registers is very often performed while complying with security characteristics. The latter make it possible on the one hand to reserve the writing function for recording devices, rated in terms of resources and of profiles, and on the other hand to prevent the registers from being able to be updated by unauthorized recording devices. In certain situations, these recording devices are managed by different entities. In order to avoid any problem of reliability of the written data, it is appropriate to prevent one and the same recording device from writing all the data of an audit. A means for distributing the writing task between several recording devices is to put in place a step of selecting the recording device to which the write command will be sent. Thus, the administration device can select, according to its own algorithm or according to an algorithm implemented by an entity for management of the cloud computing network, a recording device according to the selection mode adopted.

According to a particular characteristic, the step of selecting a recording device is dependent on the item of information received in the message emitted by the virtualized resource.

The selection of the recording device may advantageously be performed by taking account of the item of information received from the virtualized resource. If several audits are implemented, in a concurrent manner, on a cloud computing network and if these various audits are defined in agreements signed between the entity in charge of the computing network and the different entities, an item of information received from the virtualized resource allows the selection of a recording device in charge of writing the data of an audit in particular. This item of information can also allow the correlation module to advantageously select the correlation or correlations to be performed with the stored rules.

For example, the virtualized resource can indicate an identity or else give an item of information about the type of traffic relating to the item of information transmitted, in such a way that the administration device can transmit the recording command to the appropriate recording device.

According to a second aspect, the invention relates to an administration device in respect of at least one virtualized resource able to implement a method of auditing the at least one virtualized resource deployed in a cloud computing network, characterized in that it comprises:

a module for storing a set of rules which are associated with the at least one virtualized resource,     a receiver from the at least one virtualized resource of a message comprising an item of information about an event arising on said virtualized resource,     a module for correlating the item of information received with the set of stored rules,     an emitter of a command message for writing at least one datum linked to the item of information in a data register associated with the at least one virtualized resource.

According to a particular characteristic, the administration device furthermore comprises a module for selecting a recording device to which the write command message is emitted.

According to a third aspect the invention relates to a system for auditing at least one virtualized resource comprising:
- at least one administration device,
- at least one virtualized resource,
- at least one recording device comprising:
  - a receiver of command message for writing at least one datum,
  - a module for writing said datum in a register,
- at least one data register.

According to a fourth aspect, the invention also relates to a program for auditing a virtualized resource, characterized in that it comprises instructions for the implementation of the steps of the method of auditing, when said program is executed by a processor.

According to a fifth aspect, the invention also relates to a recording medium readable by an administration device on which the program is recorded.

4. DETAILED DESCRIPTION OF AT LEAST ONE EMBODIMENT OF THE INVENTION

Other characteristics and advantages of the invention will become apparent on reading, in the description detailed hereinafter, particular embodiments given by way of non-limiting examples, and the appended figures in which.

In the subsequent description, an embodiment of the method of auditing will be described, based on the updating of a register associated with the audit according to the invention.

Figure 1:
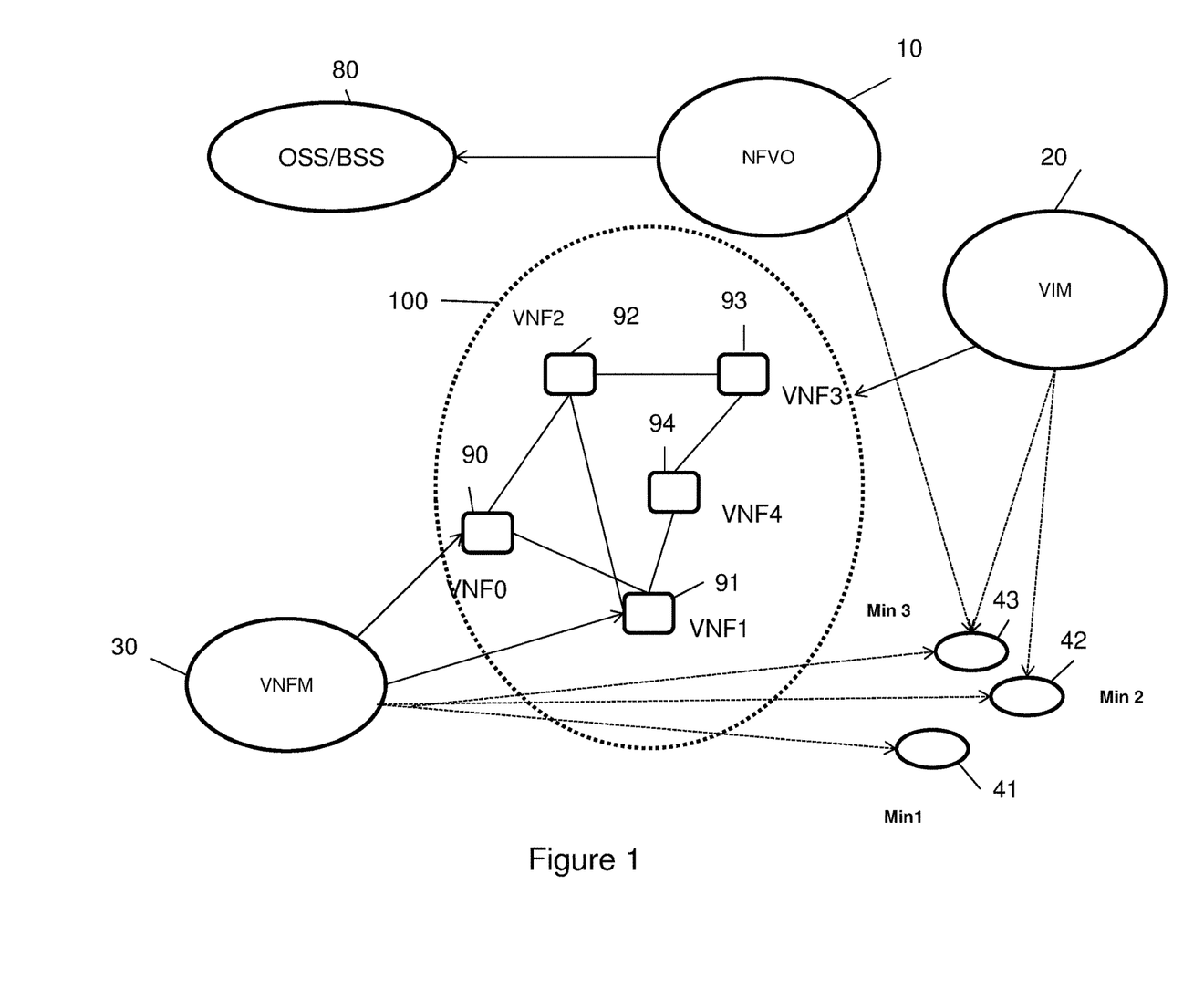
FIG. 1 presents in a schematic manner a cloud computing network, comprising virtualized resources.

Reference is firstly made to FIG. 1 which presents, according to the prior art, in a schematic manner a cloud computing network, comprising virtualized resources. This figure is inspired by the specification described in the document ETSI GS NFV 002 (October 2013 version). In this figure, the cloud computing network comprises virtual functions VNF0 90, VNF1 91, VNF2 92, VNF3 93, VNF4 94 (Virtual Network Function). The number of these virtual functions in the network is not limited. The functions supported by these VNFs can be routing, naming, addressing or security functions or any other function required in the cloud computing network. These virtual functions are deployed on a cloud computing network infrastructure 100 composed of hardware resources used for storage, calculation and interconnection. The virtual functions are implemented on these hardware resources by using a virtualization software layer. The services implemented on the network comprise infrastructure resources as well as virtual functions. The service is defined by chaining together virtual functions, the resources required in terms of hardware resources and by parameters related to the service itself comprising availability and quality of service parameters, these parameters being managed in a specific entity such as the OSS/BSS 80 (Operations Service System/Business Support System) system. The life cycle of the virtual functions is managed by a device for administration of virtual functions VNF M 30 (Virtual Network Function Manager). In FIG. 1, a single VNF M is represented but it is possible that several VNF Ms are deployed. A virtual function can be managed by its own administration device. The hardware resources, making up the infrastructure of the cloud computing network, are managed by a VIM 20 (Virtualized Infrastructure Manager). As a function of the infrastructure and resources implemented, several VIMs can be used for management. The life cycle of the services is managed by an NFVO 20 (Network Function Virtualization Orchestrator). The services can be managed by several NFVOs or equivalent administration devices. The VNF M and also the VIM and the NFVO may themselves be virtualized. Recording devices 41, 42, 43 are also represented in FIG. 1. The objective of these recording devices is to write data in registers so that said data are preserved.

The writing of the data in the registers is in particular used in block chain technologies where the recording devices ensure the recording of the transactions, the block chains being originally used for financial transactions, in blocks added regularly to a chain of blocks. The recording devices, also called miners, must use secure means to guarantee at one and the same time the recording and the veracity of the recorded data. This accuracy of the data is achieved on the basis of a consensus scheme where the miners create a succession of blocks, forming the register, chained together. The consensus scheme is aimed at certifying the integrity of each block which will be added to the chain of blocks. Secure means make it possible to prevent an entity from writing in the registers without being authorized thereto. The number of miners is not limited and the orders of writing by miner are not a priori defined and are linked to the write commands received. The miners are not necessarily all managed by the entity in charge of the cloud computing network. For certain services, it is even recommended to avoid the control of all the miners by a single entity. The miners can furthermore ensure the recording of data relating to several services implemented by a single entity or different entities.

Figure 2:
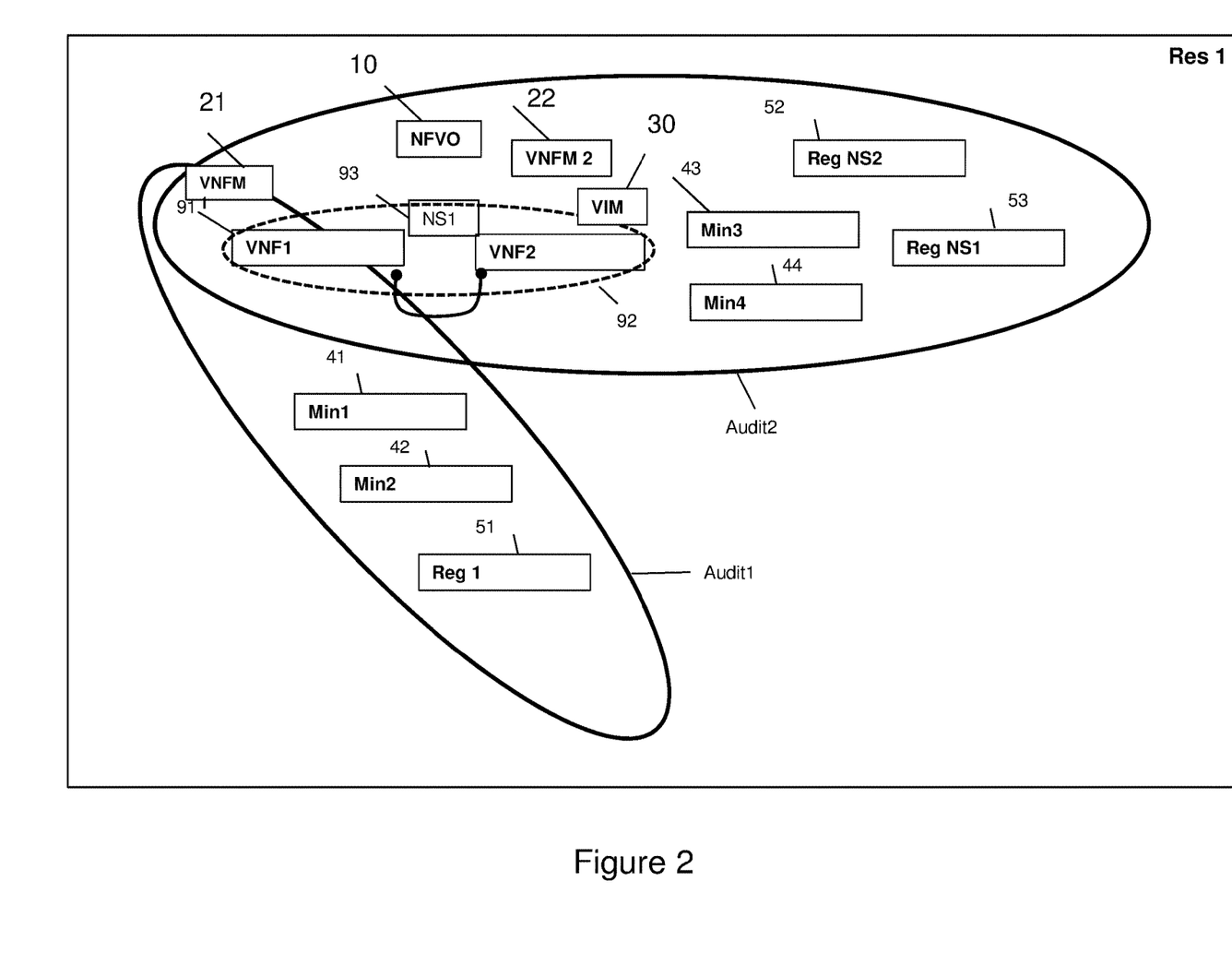
FIG. 2 presents a logical view of an audit architecture in which resources involved in the method are represented.

Reference is now made to FIG. 2 which presents a logical view of an audit architecture, according to the invention, in which resources involved in the method are represented. In this figure, two methods of auditing are implemented. The first Audit1 pertains to the VNF1 91 while the second Audit2 pertains to a service identified NS1 93.

The audit Audit1 pertaining only to a virtualized resource, only recording commands emitted by the device for administration of the VNF1 91 are transmitted to a miner. It may be envisaged that information related to the hardware resources used by the VNF1 91 are also transmitted to the miners by way of the VIM 30, either directly or via the VNFM1 21, but in the specific case presented, it is considered that only the VNFM1 21 which ensures the life cycle of the VNF1 91 transmits audit information to a miner. It is considered that the VNFM1 21 obtains the rules of the audit. It may obtain these rules from another entity, for example an administration device of OSS (Operations Support System) type or by configuration from an operator console or by loading a piece of software comprising these rules. During its life cycle, the virtualized resource VNF1 91 regularly transmits information to the administration device VNFM1 21. The information transmitted by the VNF1 91 is not all related to the audit and may be fairly diverse. In particular, the VNF1 91 may send information related to the traffic that it processes (number of packets received, number of packets transmitted, volume of data per protocol), to the performance of the VNF1 91 (deleted packets, transmission capacity used, memory resource available), to its availability (unavailability, traffic processing capability). According to the configuration of the resource VNF1 91, it sends all or some of this information to the administration device VNFM1 21. The VNFM1 21 performs, upon receipt of these data, a correlation of the latter with the audit rules obtained previously. If the audit pertains for example to the traffic processed by the VNF1 91, the VNFM1 21 then retains only the traffic-related data to transmit the command in the following step. In the case where several audits are conducted concurrently, the VNFM1 21 performs the correlation of the data as a function of the rules related to each audit. If a second audit pertains for example to availability, it then extracts the data related to performance for this specific audit. It is considered in this description that a single audit is conducted on the resource VNF1 91.

Once the correlation has been performed, the administration device VNFM1 21 sends a recording command to a miner. This command comprises a datum linked to the item of information retained in the correlation process. According to the embodiment adopted, the VNFM1 21 can transmit the whole item of information received from the resource VNF1 91 and actually corresponding to the rules of the audit or else only a part of the item of information or indeed a datum established on the basis of the item of information received. For example, if one is dealing with an audit on the traffic, rather than sending the volume of data per protocol, the VNFM1 21 can send a ratio of the volume of data for a protocol with respect to the total volume of data. In the case where no item of information received from the VNF1 91 corresponds to any of the audit rules, the VNFM1 21 does not send any command related to this item of information to the miner. The choice of the miner to which the recording command is sent can be made according to various options. A miner or a set of miners can be assigned per audit or for the whole set of audits conducted on a given resource VNF. By configuration, the VNFM1 21 will invoke this miner or this set of miners. When dealing with a set of miners, load distribution functions can be implemented. A method of selecting a miner, based for example on the datum transmitted in the recording command, can also be implemented.

Once the miner has received the recording command, it writes the datum contained in the command message in a register using the recording-related security means. There may be a register per audit or else a register collecting the data of several audits or indeed of several services requiring the recording of transactions.

The second audit represented in FIG. 2 is performed on a service identified NS1 93. The service NS1 93 relies on the VNF1 91 supervised by the VNFM1 21 and the resource VNF2 92 supervised by the administration device VNFM2 22, as well as on the hardware resources managed by the VIM 20 and services managed by the NFVO 10. Events arising on the virtualized resources managed by the VNFMs, the VIM and the NFVO are liable to generate writes in the register which is associated with the audit of the service NS 1. The entities VNFM, VIM and NFVO are configured with the rules related to the audit of the service NS1 93. The set of rules may be common to all the entities or else, in another embodiment, the rules may be specific to each entity, as a function of the events and data to be recorded in the register. During the life cycle of the service NS1 93, information related to the events occurring on the VNFs, on the hardware resources of the infrastructure and related to the implementation of the service is transmitted to the administration devices. For example, the VNFs are liable to transmit to the VNFMs information related to the traffic that they process whilst information on the availability of the interconnection links between the VNFs are sent to the VIM 20. Information relating to the quality of service of an end-to-end service is for example sent to the NFVO. Each administration device correlates the information received from the virtualized resources that they manage and decide whether to send a write command comprising information for which the correlation process has actually retained relevance with respect to the audit rules to be recorded in the audit-related register. The miners to which the various administration devices send the write commands may be common to the virtualized resources or else specific to the virtualized resources as a function of the architecture adopted. The particular feature of a service audit relative to a VNF audit as described in the first case is that several administration devices, relating to the types of events arising on the service, take part and must transmit recording commands to the miners. The administration devices involved in the audit process may be managed by different entities. In particular the service may be managed by a service provider, for example specializing in the implementation of this service, while the infrastructure composed of the hardware resources are administered by another entity, such as a telecommunications operator. The VNFs and VNFM may be managed by a third entity which may or may not be different from the other two.

Figure 3:
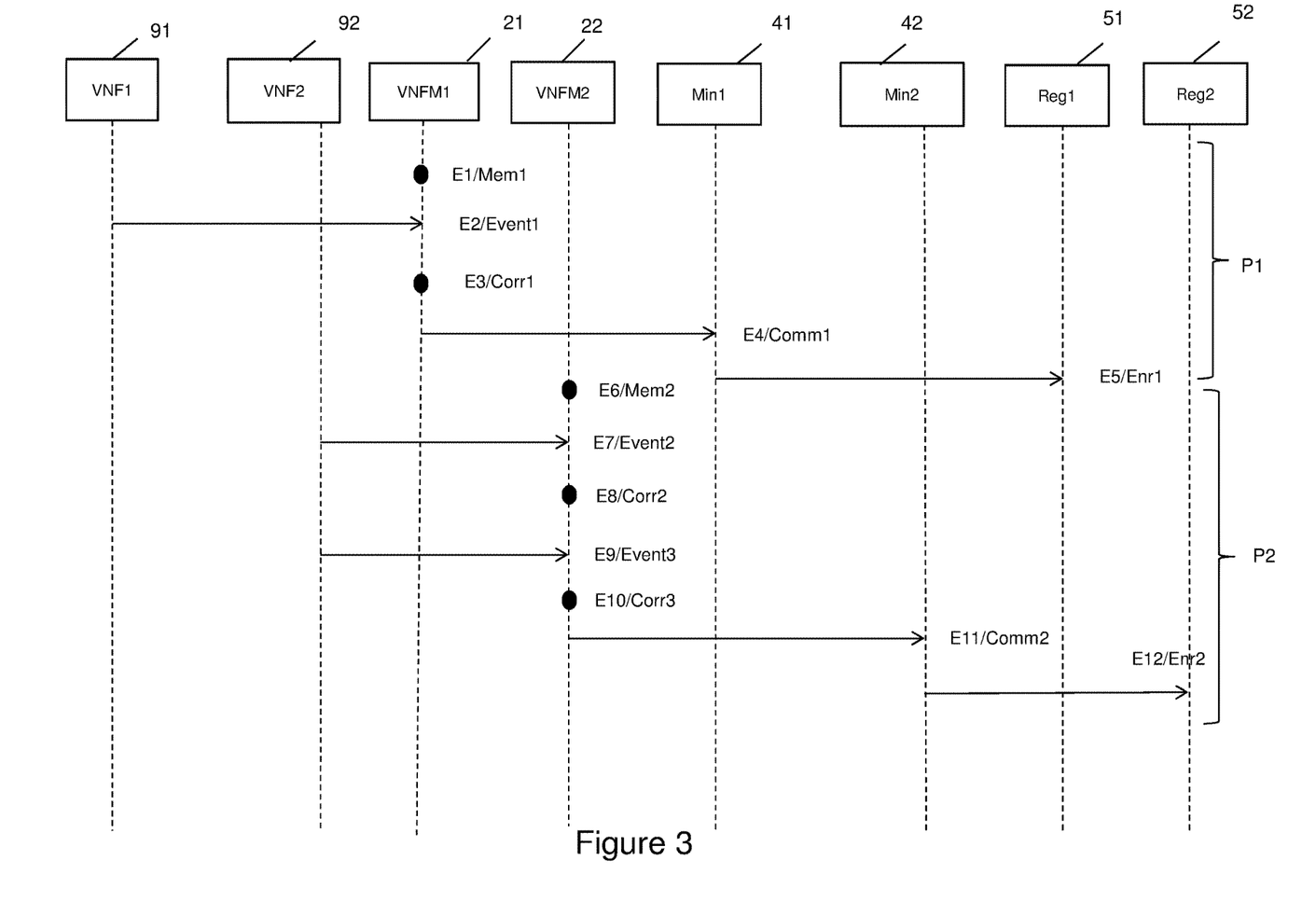
FIG. 3 describes the various steps of the method of auditing two virtual functions, according to one aspect of the invention.

Reference is now made to FIG. 3 which describes the various steps of the method of auditing two distinct virtual functions, VNF1 and VNF2, according to one aspect of the invention.

Steps E1 to E5 of phase P1 relate to the audit of the virtual function VNF1 while steps E6 to E12 of phase P2 relate to the audit of the VNF2. During a step E1, the administration device VNFM1 21 of the virtual function VNF1 91, obtains a set of rules relating to an audit of the function VNF1 91. This audit may for example be requested by a regulating authority or the provider of the VNF1 91 so as to be sure that it is operating in accordance with the nominal specifications. The set of rules would then be defined in a contract signed between the entity in charge of implementing the VNF1 91 in the network and the entity wishing to audit this virtualized resource in particular. The storing step can be carried out by a configuration of the rules on the VNFM1 21 or by sending a message comprising these rules from an entity for administration of the network. It may furthermore be necessary to verify beforehand that the VNFM1 21 has at its disposal the resources necessary to actually be able to be configured with the rules and to perform the processings in conjunction with the auditing method. A reservation of the resources that are necessary for the audit in the VNFM1 21 can be carried out so as to guarantee that the tasks related to the audit will actually be carried out, including if other processes requiring resources in the VNFM1 21 are activated in parallel. During a step E2, the VNFM1 21 is notified by a message Event1 of an event arising on the virtual function VNF1 91. According to the configuration of the resource VNF1 91, the administration device VNFM1 21 can be notified as soon as an event arises on the VNF1 91 or else the resource VNF1 91 can send the notifications at regular intervals by grouping the events that have arisen between two intervals. During a step E3, the VNFM1 21 compares the events received from the VNF1 91 and deduces therefrom the information which ought to be recorded within the framework of the audit. The VNFM1 91, when received events relate to the audit, transmits during step E4 a message Comm1 comprising a write command directed toward the miner 41. The miner is determined on the basis of an algorithm specific to the VNFM1 21 or specified for example in the contract linked to the audit. During a step E5, the miner 41, via a message Enr1, records the data present in the write command received from the VNFM1 21 in a register linked to the audit. The registers are distinct servers of the miners, located within the cloud computing network or hosted in data centers. Access to the data recorded in the registers is secure.

The audit of the virtual function VNF2 may be the same as that of phase P1, or else different. If the audit is the same, the set of rules stored in the VNFM1 21 and the VNFM2 22 is identical. Such is the case for example for verification of compliance with a hypervisor, or software allowing several systems to coexist on one and the same physical machine. The progression of the steps of phase P2 is identical to the progression of the steps of phase P1. Steps E6, E9, E10, E11, E12 are respectively identical to steps E1, E2, E3, E4, E5. Two additional steps are present in phase P2. In this phase P2, on receipt of an event Event2 during step E7, the VNFM2 22, subsequent to the correlation Corr2 performed during step E8, does not send any message comprising a write command to a register since no event corresponds to a rule obtained in a message Mem2 during step E6.

The respective steps of storing the rules in the administration devices VNFM1 21 and VNFM2 22 are implemented during the activation of the audit process, except if these rules change over the duration of the audit. The other steps of phases P1 and P2 are repeated for the duration of the audit, as a function of the audit events arising defined hereinabove. At the end of the duration of the audit, the rules can be deleted from the VNFM1 21 and VNFM2 22, while maintaining the recordings E5 and E12.

Figure 4:
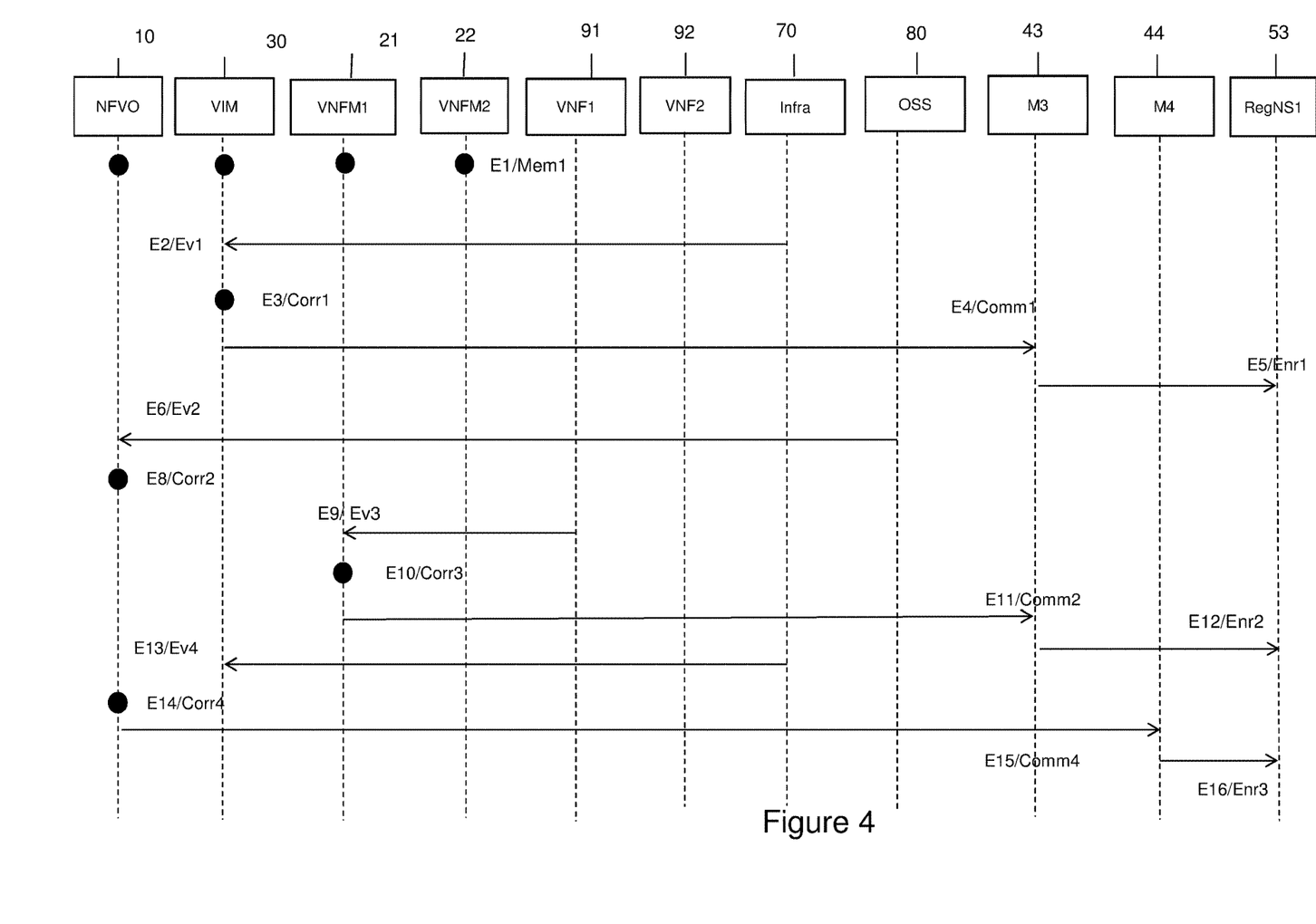
FIG. 4 describes the various steps of the method of auditing a virtualized service, the latter being based on the implementation of several virtualized resources, according to one aspect of the invention.

Reference is now made to FIG. 4 which describes the various steps of the method of auditing a virtualized service, for example an audit on the quality of service of a video broadcasting service. This audit is based on the implementation of several virtualized resources, according to one aspect of the invention. The virtualized service NS1 is implemented on the basis of two virtual functions VNF1 91 and VNF2 92 respectively supervised by the administration devices VNFM1 21 and VNFM2 22. In another embodiment, a single administration device can supervise these two virtual functions. The data streams of the service NS1 are conveyed on an infrastructure Infra 70 administered by an administration device VIM 30. The service is driven by an OSS/BSS operational operating system 80 managed by a device for administration of the life cycle of the NFVO services 10. The audit of the service NS1 makes it necessary to collect service information by way of the NFVO administration device 10, of the administration device VIM 30 as well as of the administration devices VNFM1 21 and VNFM2 22. During step E1, the rules of the audit of NS1 are stored in the administration devices that must correlate virtualized resource information so as to send it to recording devices. It is considered here that the whole set of audit rules is common to the administration devices and stored at the same time for example by virtue of a configuration message transmitted by a management entity. These administration devices as soon as they receive events arising on the virtualized resources that they supervise must compare them against the rules of the audit. Thus, during step E2, a message Ev1 comprising an event on the resources linked to the infrastructure is received by the VIM 30. For example, an interconnection link is at a load rate of 80% and this item of information is transmitted to the VIM 30 which correlates it with the rules during step E3, and transmits it in a message Comm1 to the miner M3 43 during step E4 since this event is indeed to do with the audit pertaining to the quality of service of a video broadcasting service. The miner 43 thereafter ensures the recording of this item of information by a message Enr1 sent to the register RegNS1 53 of the audit during step E5. During step E6, the OSS/BSS system 80 notifies by a message Ev2 the NFVO administration device 10, for example about the non-availability of a service class for the Voice over IP service. On receipt of this item of information, the NFVO administration device 10 establishes, during step E8, that this event is not to do with the audit and therefore decides not to send an item of information linked to this event to a miner. During step E9, the virtual function VNF1 91 transmits a message Ev3 in regard to an event linked for example with the number of video stream packets received on its interfaces to the administration device VNFM1 21. This device, on the basis of the audit rules, considers during step E10 that this item of information is to do with the audit and transmits a message Comm2 to the miner 43 during step E11, so that the latter records a datum arising from the item of information contained in the message Comm2 in the register of the audit by sending the message Enr2 during step E12. In step E13, an event linked to the hardware resources of the infrastructure 70 indicating that the link which was 80% loaded is henceforth 90% loaded is transmitted to the administration device VIM 30. The latter, after correlation with the audit rules during step E14, considers that it is indeed to do with the audit and transmits a write command Comm4 to the miner M4 44 during step E15. This miner thereafter records the item of information linked to this event by virtue of a message Enr3 sent to the audit register RegNS1 53 during step E16. The miner to which the administration device VIM 30 sends the write command is different from the previous one so as to prevent one and the same miner from ensuring the recording of all the data of the audit. It should be noted that the recording commands sent by the administration devices may comprise an item of information linked to the reading rights in respect of the datum included in the write command message. This may turn out to be particularly useful in the case where the audit has been contractualized with another entity, and certain information ought to be shared with this entity while other data are considered to be confidential. Furthermore, the administration device has the possibility of transmitting a write command grouping together several previously correlated data. In this case, the administration device keeps the data until a command message comprising the untransmitted data is sent to a miner. This embodiment makes it possible to limit the number of messages transmitted by an administration device to a miner.

Figure 5:
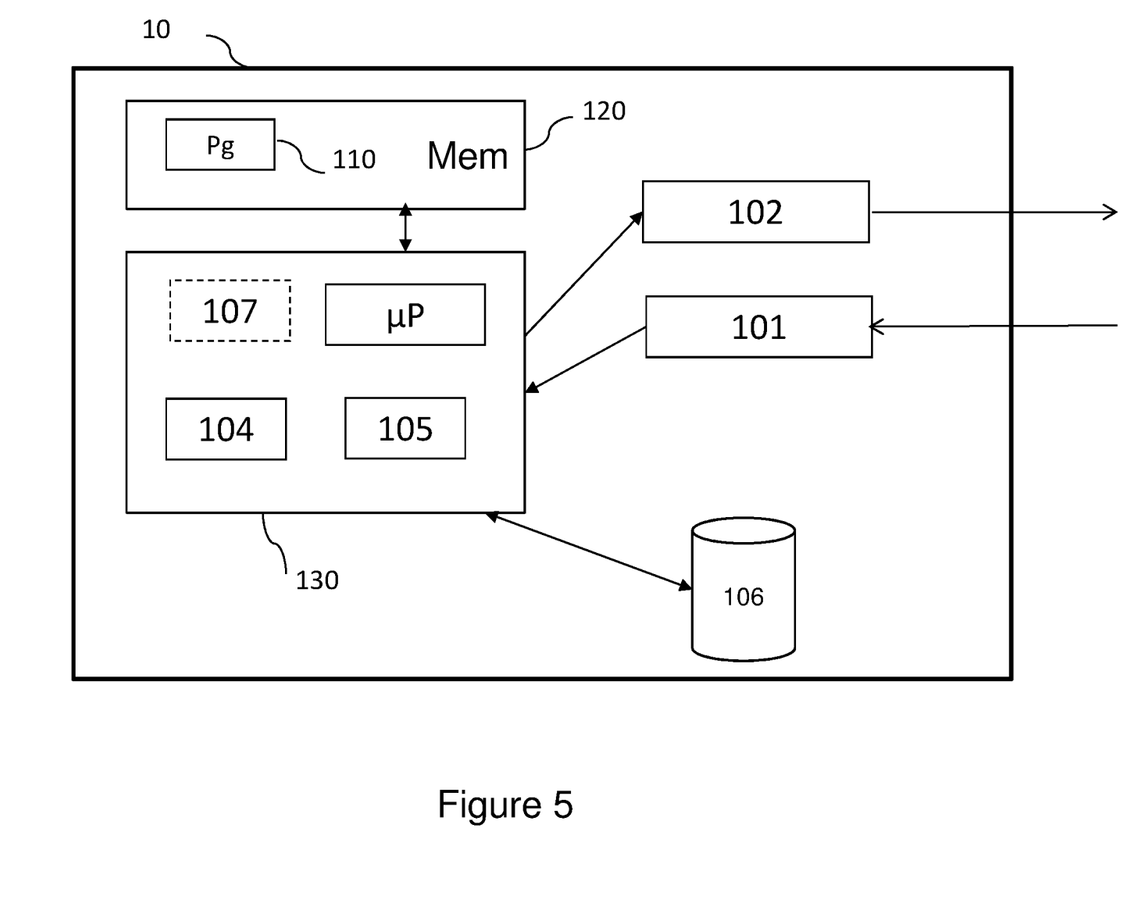
FIG. 5 represents a structure of an administration device able to implement a method of auditing, which is based on the updating of a register associated with the audit.

In conjunction with FIG. 5, an exemplary structure of an administration device able to implement a method of auditing is now presented, based on updating a register associated with the audit.

The device 10 for administration of at least one virtualized resource implements the method of auditing based on the updating of a register associated with the audit, of the at least one virtualized resource deployed in a cloud computing network.

For example, the administration device 10 comprises a processing unit 130, equipped for example with a microprocessor μP, and driven by a computer program 110, stored in a memory 120 and implementing the method of auditing according to the invention. On initialization, the code instructions of the computer program 110 are for example loaded into a RAM memory, before being executed by the processor of the processing unit 130.

Such a device 10 comprises the following modules:
- a storage module 104, able to store a set of rules associated with the at least one virtualized resource,
- a receiver 101, able to receive a message from the at least one virtualized resource comprising an item of information about an event arising on said virtualized resource,
- a correlation module 105, able to correlate an item of information received with the set of stored rules,
- an emitter 102, able to emit a command message to write in a data register associated with the at least one virtualized resource at least one datum linked to the item of information,
- a database 106 designed to preserve the rules linked to at least one audit.

Optionally, in another embodiment, the administration device 10 furthermore comprises a selection module 107, able to select a recording device as a function of the item of information about an event arising on a virtualized resource, in the message received from a virtualized resource.

The modules described in conjunction with FIG. 5 may be hardware modules or software modules.

The invention is not limited to the exemplary embodiments hereinabove described and represented and on the basis of which it will be possible to provide for other modes and other forms of embodiment, without however departing from the scope of the invention. The method may in particular be implemented in an environment where the registers in which the audit data are recorded are blocks which are added to existing chains of blocks. The chain of blocks thus constructed over time contains all the data recorded by the miners as the audit continues. Depending on the type of audit and in particular the size of the latter, it could turn out to be useful to specialize the registers for sub-parts of the audit thus making it possible to limit the size of the registers and to give these registers different reading rights in the case where an external entity accesses certain data of the audit. There is no a priori limitation as regards the numbers of administration devices that can be involved in a given audit and these administration devices may also be virtualized so as to be integrated into the cloud computing network on which the virtualized resources are audited according to the method of auditing described. In the case where a virtualized resource supports several elementary services such as for example naming and addressing functions, the method of auditing described makes it possible to discriminate these elementary functions in a specific manner by identifying the virtualized resource as the addressing function or the naming function and not as the virtualized resource encompassing the two elementary functions.

The invention claimed is:

1. A method of auditing at least one virtualized resource deployed in a cloud computing network, implemented by an administration device in respect of the at least one said resource, able to administer virtual network functions, a virtual infrastructure or network services, the method comprising acts of:
   storing a set of rules of an audit of a parameter of at least one virtualized network service implemented on the basis of a plurality of interconnected virtual network functions;
   receiving from the at least one virtualized network service a message comprising an item of information about an event arising on the at least one virtualized network service;
   determining if the item of information received corresponds to the audited parameter; and
   in response to the item of information corresponding to the audited parameter, sending, to a recording device, a command message for writing at least one datum linked to the received item of information in a data register associated with the at least one virtualized network service.

2. The method of auditing, as claimed in claim 1, furthermore comprising reserving resources, comprising storage and processing capabilities, in the administration device as a function of the set of rules of the audit to be stored.

3. The method of auditing, as claimed in claim 1, where the act of storing the set of rules is preceded by obtaining said set of rules from a single network management device.

4. The method of auditing, as claimed in claim 1, where the command message for writing comprises an item of information linked to reading rights in respect of said datum.

5. The method of auditing, as claimed in claim 1, where the set of rules associated with the at least one virtualized network service comprises parameters relating to availability and to performance of the at least one virtualized network service.

6. The method of auditing, as claimed in claim 1, where the command for writing in a data register associated with the at least one virtualized network service is sent later on.

7. The method of auditing, as claimed in claim 1, where the act of sending is preceded by selecting the recording device to which the item of information is sent.

8. The method of auditing, as claimed in claim 7, where the act of selecting a recording device is dependent on the item of information received in the message emitted by the at least one virtualized network service.

9. An administration device in respect of at least one virtualized resource able to implement a method of auditing the at least one virtualized resource deployed in a cloud computing network, wherein the administration device comprises:
   a processor; and
   a non-transitory computer-readable medium comprising instructions stored thereon which when executed by the processor configure the administration device to:
   store a set of rules of an audit of a parameter of at least one virtualized network service implemented on the basis of a plurality of interconnected virtual network functions;
   receive a message from the at least one virtualized network service comprising an item of information about an event arising on said at least one virtualized network service;
   determine if the item of information received corresponds to the audited parameter; and
   emit a command message for writing at least one datum linked to the item of information in a data register associated with the at least one virtualized resource.

10. The administration device, as claimed in claim 9, wherein the instructions further configure the administration device to select a recording device to which the command message for writing is emitted.

11. A system for auditing at least one virtualized resource comprising:
   at least one administration device able to implement a method of auditing at least one virtualized resource deployed in a cloud computing network, the administration device comprising:
   a processor; and a non-transitory computer-readable medium comprising instructions stored thereon which when executed by the processor configure the administration device to:
  store a set of rules of an audit of a parameter of at least one virtualized network service implemented on the basis of a plurality of interconnected virtual network functions;
  receive a message from the at least one virtualized network service comprising an item of information about an event arising on the at least one virtualized network service;
  determine if the item of information corresponds to the audited parameter; and
  emit a command message for writing at least one datum linked to the item of information in a data register associated with the at least one virtualized network service;
the at least one virtualized network service;
at least one recording device comprising:
  a receiver of the command message for writing at least one datum;
  a module for writing said datum in a register; and
at least one data register.

12. A non-transitory computer-readable recording medium on which is recorded a program comprising instructions for implementing a method of auditing at least one virtualized resource deployed in a cloud computing network, when the instructions are executed by a processor of an administration device able to administer virtual network functions, a virtual infrastructure or network services, wherein the instructions configure the administration device to:
  store a set of rules of an audit of a parameter of at least one virtualized network service implemented on the basis of a plurality of interconnected virtual network functions;
  receive from the at least one virtualized network service a message comprising an item of information about an event arising on the at least one virtualized network service;
  determine if the item of information received corresponds to the audited parameter; and
  in response to the item of information received corresponding to the audited parameter, send, to a recording device, a command message for writing at least one datum linked to the received item of information in a data register associated with the at least one virtualized network service.

* * * * *